United States Patent [19]

Pease et al.

[11] Patent Number: 5,308,496
[45] Date of Patent: May 3, 1994

[54] RESIN REGENERATION PROCESS

[75] Inventors: Richard A. Pease, Bear, Del.; David J. Rodini, Midlothian, Va.

[73] Assignee: E. I. Du Pont de Nemours and Company, Wilmington, Del.

[21] Appl. No.: 39,565

[22] Filed: Mar. 29, 1993

[51] Int. Cl.$^5$ ............................................. B01J 49/00
[52] U.S. Cl. ................................. 210/674; 210/677; 210/702; 210/712; 521/26
[58] Field of Search ............... 210/665, 674, 677, 702, 210/712; 521/26

[56] References Cited

U.S. PATENT DOCUMENTS

| | | | |
|---|---|---|---|
| 4,372,858 | 2/1983 | Ritter | 210/674 |
| 5,081,159 | 1/1992 | Cutler | 521/26 |
| 5,091,424 | 2/1992 | Lindy | 521/26 |

FOREIGN PATENT DOCUMENTS 53-15110  5/1978  Japan .

OTHER PUBLICATIONS

Amberlyst A-21, Technical Bulletin, Fluid Process Chemicals Department, pp. 1-5.

*Primary Examiner*—Ivars Cintins

[57] ABSTRACT

Hydrogen chloride is stripped from spent basic ion exchange resin by treatment with a solution of a tertiary amine in an amide solvent. The eluent solution is treated with anhydrous ammonia to precipitate ammonium chloride. The solution of tertiary amine in amide solvent is separated from the precipitate and may be used to regenerate spent resin.

3 Claims, No Drawings

RESIN REGENERATION PROCESS

BACKGROUND OF THE INVENTION

Poly(m-phenylene isophthalamide) is synthesized by the reaction of isophthaloyl chloride and m-phenylene diamine in dimethylacetamide (DMAc). Hydrogen chloride, a byproduct of the reaction, is corrosive and has an adverse effect on the polymer. The hydrogen chloride can be removed by contacting the solution with an ion-exchange resin in base form resulting in an HCl-free solution generally suitable for spinning. The present invention deals with regeneration of the spent or exhausted ion exchange resin.

SUMMARY OF THE INVENTION

The present invention provides a process for regenerating a bed of spent basic ion exchange resin in hydrogen chloride salt form and recovering the regenerant solution comprising:

a) passing a regenerant solution comprising a tertiary amine in an amide solvent through the bed to regenerate the spent resin and form an amide solution of the hydrogen chloride salt of the tertiary amine;

b) treating the resulting solution with anhydrous ammonia to precipitate ammonium chloride and form a solution consisting of the tertiary amine in amide solvent; and c) separating the regenerant solution from the precipitate.

DETAILED DESCRIPTION OF THE INVENTION

The present invention concerns the regeneration of a weakly basic ion exchange resin that is spent by virtue of adsorption of hydrogen chloride. Weakly basic anion exchange resins, such as Amberlyst® A-21 (Rohm & Haas, Philadelphia, Pa.) which bears tertiary amine functional groups, are useful in this process. Regeneration is achieved by passing an anhydrous solution of a tertiary amine, such as tri-n-butylamine in an amide solvent, conventionally DMAc, through a column of the spent resin which would be in the HCl-salt form. As the solution passes through the column, the HCl is stripped from the ion exchange resin converting it back to the free base form. The HCl forms a salt with the tertiary amine and is carried away by the anhydrous amide solution. The effluent comprising the tertiary amine hydrochloride in amide solvent is then neutralized with anhydrous ammonia and the ammonium chloride which forms is removed by filtration. The filtrate is now ready for use for resin bed regeneration. The solvent content of the filtrate can be reduced if desired by low temperature vacuum distillation or other means.

If the resin had been previously treated with a polymer solution containing HCl, it is desirable to flow anhydrous DMAc through the spent resin until the effluent is free of residual polymer before treatment with the tertiary amine solution. The solution of tertiary amine in amide solvent is then flowed through the spent resin to convert the resin to the free base form. Flow is continued until the effluent contains little or no HCl salt of the tertiary amine. The column is then rinsed with the amide solvent and is once again ready for adsorption of HCl.

The following example is illustrative of the invention.

EXAMPLE

A jacketed flask approximately 10.2 cm in diameter and 30 cm in height with an inlet port at the top and an exit port at the bottom, is filled to a height of 21 cm with weakly basic A-21 ion exchange resin available from Rohm & Haas Co. This resin is conditioned with two bed volumes of 1.5N aqueous sodium hydroxide followed by a water wash and then two bed volumes of 2N HCl, followed by water rinsing until the effluent of the column is neutral. The above conditioning procedure is repeated. Following the water rinse the column is rinsed with 5 bed volumes of anhydrous DMAc to prepare the column for anhydrous non-aqueous conditions.

To a jacketed 3L three-necked flask is added approximately 1000 grams of a 13% polymer solids solution of poly(m-phenylene isophthalamide) in DMAc containing about 4% of HCl. The jacketed flask containing polymer and the jacketed flask containing the resin are heated using a circulating water bath of 70° C. The polymer solution is stirred and pumped into the inlet port of the resin-containing flask at a rate of approximately 14 g/min. The eluent leaving the exit port of the flask containing the resin is tested periodically for polymer (by sampling and testing for polymer via precipitation). Once polymer is detected, the effluent is collected in a separate container. Polymer is collected until very little polymer is detected in the effluent. The collected material is a solution of poly(m-phenylene isophthalamide) in DMAc.

Anhydrous DMAc is flowed through the resin until the effluent is polymer free. Next, approximately 1800 ml of a 12% solution of amine (TBA) in DMAc is flowed through the column. After all the TBA solution has been passed through the column, the column is rinsed with 1500 ml of DMAc. The effluent is collected. The resin is now in the free amine state and ready for adsorption of HCl.

Solvent is removed from the effluent solution by low temperature vacuum rotary evaporation until the concentration of tri-n-butylamine hydrochloride is determined to be 12% as tri-n-butylamine. This solution is treated with approximately 14 grams of anhydrous ammonia gas and ammonium chloride precipitates from solution. The ammonium chloride is separated from the solution via filtration. The tri-n-butylamine-DMAc solution is now ready to be used for resin bed regeneration.

We claim:

1. A process for regenerating a bed of spent weakly basic anion exchange resin in the hydrogen chloride salt form and recovering regenerant solution comprising:

a) passing a regenerant solution comprising a tertiary amine in an amide solvent through the bed to regenerate the spent resin and form an amide solution of the hydrogen chloride salt of the tertiary amine;

b) treating the resulting solution with anhydrous ammonia to precipitate ammonium cloride and form a solution consisting of tertiary amine in the amide solvent; and c) separating regenerant solution from the precipitate.

2. A process according to claim 1 wherein the amide solvent is dimethyl acetamide and the tertiary amine is tri-n-butylamine.

3. A process according to claim 1 wherein the separated regenerant solution is used to regenerate further amounts of spent basic ion exchange resin in the hydrogen chloride salt form.

* * * * *